June 23, 1925.
L. S. DOWNS
VALVE
Filed Sept. 7, 1923
1,542,992
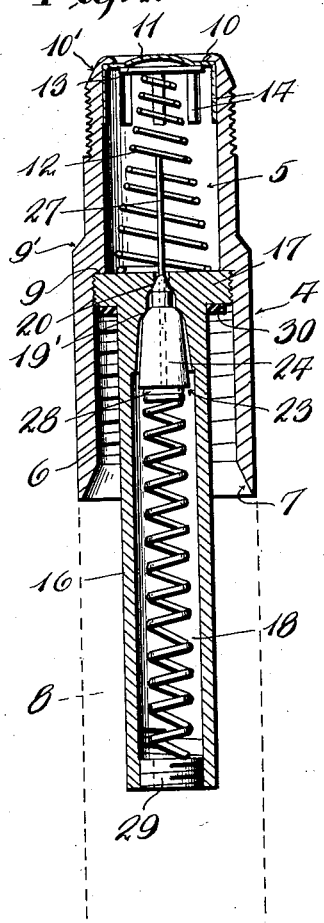
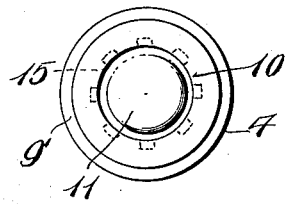
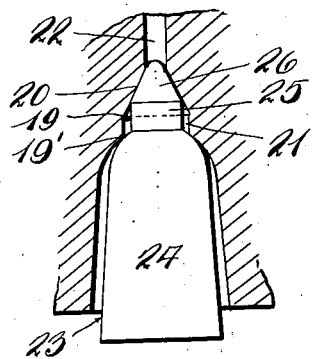

Patented June 23, 1925.

1,542,992

UNITED STATES PATENT OFFICE.

LINCOLN S. DOWNS, OF EAST CLEVELAND, OHIO.

VALVE.

Application filed September 7, 1923. Serial No. 661,496.

*To all whom it may concern:*

Be it known that I, LINCOLN S. DOWNS, citizen of the United States, residing at East Cleveland, in the county of Cuyahoga and State of Ohio, have invented certain new and useful Improvements in Valves, of which the following is a specification.

This invention relates to improvements in valves for automobile tires and the like, having for an object the positive elimination of the well known slow leak so common in ordinary tire valves.

It is likewise an object to provide a combination of a valve stem cap and valve seat, wherein the structure is simplified to reduce cost of manufacturing and to permit utilization by inexperienced persons.

Other objects will be in part obvious and in part pointed out hereinafter.

In order that the invention and its mode of operation may be readily understood by those skilled in the art, I have in the accompanying drawings and in the following detailed descriptions based thereon, set out the preferred embodiment of my invention.

In these drawings:

Fig. 1 is a vertical longitudinal section of the valve stem cap.

Fig. 2 is a top plan or end view of the valve stem cap, and

Fig. 3 is a detail of an adjustable plug adapted to be used with a double seat.

Having more particular reference to the drawings in which similar characters of reference will designate similar parts throughout, the improved valve cap and double seat may be stated as comprising a valve stem cap or body portion 4, having an opening 5 there-through, the inner or lower portion of said opening being threaded as at 6 and having a tapered inner face 7 at the extreme outer end, whereby upon attachment of the valve stem cap to a standard valve stem 8, a sufficiently close or tight fit between the usual shoulder formed upon the valve stem and the tapered portion 7 will be effected and prevent entry of foreign matter. The opening 5, is reduced in diameter at a point substantially mid-way its length thereby providing an interior annular shoulder 9, whose function will be hereinafter stated. The outer end of the reduced externally threaded portion is tapered and rolled or turned inwardly to provide an annular flange 10, against which is seated an inwardly movable crowned disc or closure 11, which is normally seated through the medium of an expansion spring 12, whose inner end bears against the head 17 as shown in assembly.

This closure disc 11 is provided with a set of circumferentially spaced longitudinally extending legs 14, which contact slidably with the inner reduced portion of the opening 5 in the body portion 4, thereby serving as a guide for the closure disc. These legs snugly engage the wall of said opening, and have formed there-between notches or recesses 15 through which air passes when the closure disc is moved downwardly under the pressure of in-coming air or the fixture of an inflating pump or the like. It is understood that the annular flange covers the recess or notches when closed and prevents entry of any foreign matter. Arranged or formed upon the outer end of the body portion 4, is a tapered edge 10' which is snugly engageable by exterior threads or otherwise with the fixture carried by the inflating hose so as to insure against leakage of air while inflating the tire by a hand pump.

A valve seat headed extension is provided and includes a stem 16, carrying at one end a threaded head 17, which is engaged with threads in the opening of said body portion 4 and is screwed up against the aforementioned interior shoulder 9, incidentally forming a base for the expansion spring which retains the closure disk in position. The extension is provided with a bore 18, in the upper or outer portion of which is formed a double contact air stop valve seat 19, as shown.

The lower or inner air stop or seat 19' is preferably substantially semi-spherical and merges into the bore 18, at the innerside, and into the chamber 21, at its outer side, said dead chamber spacing and connecting the inner stop 19' and the outer stop or seat 20 of the seat 19, the outer stop of the seat preferably being tapered as shown and merging into the reduced bore 22 as indicated, and adaptable to be used with a plug 23' which is formed from a suitable rubber composition or other material and consisting of a body 24 semi-spherically curved to snugly fit the first section or stop seat contact 19', and having a reduced extension from its center 25, which is spaced from the walls of the chamber, and is tapered as at 26, to snugly wedge into the similarly shaped inner section or stop seat contact 20.

In order that this plug may be properly and accurately seated, there is provided a straight length of wire 27 which passes longitudinally through the plug, is coiled at its base as at 28 and is formed into an expansion spring, whose tension is controllable through adjustment of a threaded apertured plug 29 adjustably arranged in the lower or inner end of the extension as shown. This spring insures snug seating of the plug upon both seats.

In application of this combination of valve stem cap and valve seat, the usual valve mechanism is removed from any valve stem and the extension of this valve assembly container is inserted in the bore, the valve stem cap 4 is then tightly screwed on to the outer end of a valve stem, whereupon air tight connection is effected as between the two members, due to the packing ring or gasket 30 engaging the upper end of the valve stem, making the assembly permanent and complete. Through the installation of the disc in the top end of the cap, the necessity of removing and replacing a member from the top of valve stem is eliminated and time and effort saved at every inflation of a tire.

Under air pressure of an inflating pump or the like it is understood that the disc closure will move inwardly pressing against the stem on which the valve plug is mounted, causing said plug to unseat to permit the passage of the air into the tire, and the tendency of air leakage through the valve is taken care of through provision of the double seat it being seen that even though a small quantity of air should escape around the first seat it would not be likely to pass by the next seat. In other words the dead air chamber between the air stop contacts serves to eliminate air pressure from the inner tire tube preventing leakage of air past the tapered outer air stop seat contact.

Manifestly, the construction shown, is capable of considerable modification and such modification as may fall within the scope of my claims, I consider within the spirit of my invention.

I claim:

1. A valve carrying cap for a standard valve stem, comprising a body portion having a central bore, an annular shoulder formed in said bore at a point substantially midway the length of said body, a closure at one end of said bore, said bore being threaded from its open end to said shoulder, a stem, an enlarged disc-shaped threaded head carried by said stem and arranged in the threaded bore in abutment with said shoulder, said head and stem having a central bore, a pair of spaced seats arranged in the bore of the head and stem, a yieldable plug arranged in the bore of the head and stem and having a pair of spaced portions adapted for contact with said seats, a coil expansion spring arranged in the bore to normally seat the plug, and means whereby the spring tension may be varied.

2. A valve carrying cap for a standard valve stem, including a body portion having a central bore extending therethrough, an annular shoulder formed substantially mid-way the length of the bore, said bore being threaded at one side of said shoulder, a circular threaded head engageable with the threaded bore and adapted to abut the shoulder, a central extension carried by said head and projecting outwardly from the threaded end of said bore, said head and extension having a longitudinal opening therethrough, a pair of longitudinally spaced valve seats formed in the bore adjacent said head, one of said seats being substantially semi-spherical and the other being tapered and spaced outwardly from the other seat, a yieldably seated resilient plug having a substantially semi-spherical portion adapted to snugly fit the semi-spherical seat and a tapered portion formed at the end of said plug and adapted to engage the tapered seat.

In testimony whereof, I affix my signature.

LINCOLN S. DOWNS.